United States Patent [19]

Shibata

[11] 4,150,982

[45] Apr. 24, 1979

[54] AG-METAL OXIDES ELECTRICAL CONTACT MATERIALS CONTAINING INTERNALLY OXIDIZED INDIUM OXIDES AND/OR TIN OXIDES

[75] Inventor: Akira Shibata, Yokohama, Japan

[73] Assignee: Chugai Denki Kogyo Kabushiki-Kaisha, Japan

[21] Appl. No.: 885,536

[22] Filed: Mar. 13, 1978

[51] Int. Cl.[2] .......................... B32B 15/00; C22C 5/10

[52] U.S. Cl. ................................ 75/173 A; 75/173 R

[58] Field of Search .......................... 75/173 R, 173 A

[56] References Cited

U.S. PATENT DOCUMENTS

| | | | |
|---|---|---|---|
| 3,811,876 | 5/1976 | Harigaya et al. | 75/173 R |
| 3,933,485 | 1/1976 | Shibata | 75/173 A |
| 3,933,486 | 1/1976 | Shibata | 75/173 A |
| 3,989,516 | 11/1976 | Haarbye | 75/173 A |

FOREIGN PATENT DOCUMENTS

| | | | |
|---|---|---|---|
| 1434510 | 5/1976 | United Kingdom | 75/173 A |

*Primary Examiner*—L. Dewayne Rutledge
*Assistant Examiner*—Upendra Roy
*Attorney, Agent, or Firm*—Shlesinger, Fitzsimmons & Shlesinger

[57] ABSTRACT

An electrical contact material obtained through internally oxidizing a silver alloy which is the solid solution with 3 to 11 weight percent of tin and other solute metal element(s). The alloy material is improved of its contact resistance by diffusing into the silver matrix 0.1 to 5 weight percent of metals having a decomposition and sublimation temperature lower than the melting point of silver and then by internally oxidizing the material.

4 Claims, No Drawings

AG-METAL OXIDES ELECTRICAL CONTACT MATERIALS CONTAINING INTERNALLY OXIDIZED INDIUM OXIDES AND/OR TIN OXIDES

This invention relates to improved Ag-metal oxides electrical contact materials, and more particularly, it relates to Ag-metal oxides electrical contact materials containing internally oxidized indium oxides and/or tin oxides and having improved electric characteristics.

Silver-tin oxide-indium oxide electrical contact materials, such as disclosed for example in U.S. Pat. Nos. 3,874,941 and 3,933,485, have excellent refractoriness. Similar to these aforementioned contact materials, silver-tin oxide-bismuth oxide electrical contact materials, such as disclosed for example in U.S. Pat. No. 3,933,486, also have excellent refractoriness, too.

However, since tin-oxides and indium oxides have sublimation temperatures far higher than the melting point of silver, they are not entirely satisfactory with respect to their contact resistances, especially when they are used under low current.

In the case of silver-tin oxide-indium oxide contact materials, their practically acceptable refractoriness is assured when they contain 3–11 weight % of Sn and 1–13 weight % of In, the total amount of these solute metals being 4–16 weight %. When the amount of tin is less than 3% (percentages hereinafter appearing are weight percentages unless otherwise mentioned), the refractoriness of obtained contact materials is practically insufficient, while more than 11% of Sn is not employable because Sn in this amount can not make a solid solution with Ag. It shall be noted that 1–13% of indium is such amount that it can successfully precipitate Sn dispersedly in a silver matrix, when an alloy containing Sn of the aforementioned percentage is internally oxidized. It shall be noted also that the limitation of the total amount of the solute metal, viz., 4–16%, is a range within which they are internally oxidizable.

In case of silver-tin oxide-bismuth oxide contact material, practically acceptable excellent refractoriness is obtainable when Sn is in a range of 3–11%, and Bi is 0.01–2%. These limitations are on account of the same reasons as mentioned above in connection with silver-tin oxide-indium oxide alloy contact material.

Now, in order to give better contact resistance to Ag-metal oxides contact material of the above-mentioned type which contains tin oxides, it is contemplated by the inventor to add to the contact material metals such as Zn, Cd, and Ca having a sublimation temperature lower than silver, as oxides. However, it has been found that the addition of auxiliary metal elements such as Zn, Cd, and Ca directly to the aforementioned kinds of Ag-metal alloy, and the subsequent internal oxidation thereof, is impossible, because said Ag-metal alloy already contains a maximum amount of solute metals which are internally oxidizable.

In view of the above, an object of this invention is to provide silver alloy electrical contact materials containing a maximum internally oxidizable amount of highly refractory metal oxides, and also containing auxiliary metal oxides which have a sublimation temperature about, or lower than, the melting point of silver, and which can improve contact resistance of the silver alloy electrical contact materials.

This kind of silver alloy electrical contact material is obtained in accordance with this invention by internally oxidizing an alloy comprising silver matrix containing 3–11% of Sn and 1–13% of In, or an alloy comprising silver matrix containing 3–11% of Sn and 0.01–2% of Bi, then plating over these internally oxidized alloy materials one or more auxiliary solute metals such as Zn, Sb, Cd, diffusing and alloying the auxiliary solute metals with the previously internally oxidized alloy materials, and internally oxidizing the resultant material.

The working principle of the above two-step internal oxidation process, which enables an alloy of silver-metal oxides that already contains a maximum amount of internally oxidizable solute metals, to contain additional oxidized solute metals, is that when the alloy has first been internally oxidized, the silver matrix of the alloy becomes pure silver having about 50 volume % of the total volume % of the internally oxidized alloy, and the auxiliary solute metals can then form solid solutions with said pure silver and can be internally oxidized, irrespectively of the previous internal oxidation, and will not adversely affect the metal oxides which have been previously precipitated in the silver matrix by the primary or first internal oxidation step.

It has also been found that in order to improve the contact resistance of silver-tin oxides electrical contact materials of the kind mentioned above, the addition of 0.1–5% of one or more of metals such as Zn, Cd, and Ca is sufficient. Besides Zn, Cd, and Ca, Sb, Pb, Mn, Mg and other solute metals which can be diffused to a silver matrix at a temperature about the melting point of silver can be likewise employed along with Zn, Cd, and/or Ca. It shall be noted also that Sn and In can be added also as auxiliary solute metals together with one or more of solute metals having a decomposition and sublimation temperature lower than the melting point of silver, so that the alloy contact materials in accordance with this invention can have further higher refractoriness as well as stable contact resistance.

The scope of this invention covers also Ag-3–11% of Sn-1–13% In alloy and Ag-3–11% of Sn-0.01–2% of Bi alloy, less than 20% of solute metals of which are substituted by ferrous metals, Mn, Mg, Mo, Zr, Ca and so on, which can work for comminuting crystals, retarding the growth of coarse crystals, or preventing cracks from forming in the material at the time of internal oxidation as a result of the increase in the ratio of solute metals to the silver base.

This invention shall be explained more in detail and more concretely hereinunder in the examples.

EXAMPLE A

Ag-Sn(3%)-In(1%)-specimen(1)
Ag-Sn(3%)-In(13%)-specimen(2)
Ag-Sn(8%)-In(3%)-Ni(0.2%)-specimen(3)

Each of the above alloys were melted and fed dropwise into water, whereby spheroidal pieces of alloy of 1 mm diameter were obtained. The pieces were internally oxidized at 700° C. for 12 hours under an oxidizing atmosphere of 10 atm. The surfaces of the pieces were washed by 5% nitric acid solution. Either Zn, Cd, Ca, Zn-Sb, Zn-Cd, Zn-Ca, Sb-Cd, Sb-Ca, Cd-Ca, Zn-Sb-Cd, Zn-Sb-Ca, Sb-Cd-Ca, Ca-Cd-Zn, or Zn-Sb-Cd-Ca was plated at 0.5μ thickness over the pieces. The pieces were hot-pressed at 400° C. to form a billet of 50 mm diameter and 150 mm length. The billet was heated to 700° C. and extruded to a wire of 3 mm diameter. This wire was internally oxidized at 700° C. for 5 hours under oxygen of 1 atm. Wires were cut and made into discal pieces each of 5 mm diameter and 1 mm thickness, after which a discal piece was cold abutted to a rivet-shaped copper base having a head of 5 mm diameter and 1 mm thickness and a shank of 3 mm diameter and 3 mm height.

Thus obtained internally oxidized discal contact materials are as follows:

(a) Ag-Sn(3%)-In(1%)-Zn(2%)
(b) Ag-Sn(3%)-In(13%)-Cd(5%)
(c) Ag-Sn(8%)-In(3%)-Ni(0.2%)-Ca(0.1%)
(d) Ag-Sn(3%)-In(1%)-Zn(1%)-Sb(1%)
(e) Ag-Sn(3%)-In(13%)-Zn(1%)-Ca(0.1%)
(f) Ag-Sn(8%)-In(3%)-Ni(0.2%)-Sb(1%)-Cd(3%)
(g) Ag-Sn(3%)-In(1%)-Zn(2%)-Sb(1%)-Ca(0.1%)
(h) Ag-Sn(3%)-In(13%)-Cd(1%)-Ca(0.1%)
(i) Ag-Sn(8%)-In(3%)-Ni(0.2%)-Zn(0.1%)-Sb(0.1%)-Cd(3%)
(j) Ag-Sn(3%)-In(1%)-Zn(1%)-Sb(1%)-Ca(0.1%)
(k) Ag-Sn(3%)-In(13%)-Ca(0.1%)-Cd(2%)-Zn(1%)
(l) Ag-Sn(8%)-In(3%)-Fe(0.01%)-Zn(0.1%)-Sb(0.1%)-Cd(1%) Ca(0.01%)

EXAMPLE B

Ag-Sn(3%)-Bi(0.01%)-specimen (4)
Ag-Sn(12%)-Bi(0.2%)-specimen (5)
Ag-Sn(8.5%)-Bi(0.1%)-Ni(0.5%)-specimen (6)

The above alloys were made to the following internally oxidized alloys by the same steps of Example A.

(m) Ag-Sn(3%)-Bi(0.01%)-Zn(0.1%)
(n) Ag-Sn(12%)-Bi(0.2%)-Sb(2%)-Zn(1%)
(o) Ag-Sn(8.5%)-Bi(0.1%)-Ni(0.5%)-Cd(5%)
(p) Ag-Sn(8.5%)-Bi(0.1%)-Ca(1%)
(q) Ag-Sn(8.5%)-Bi(0.1%)-Pb(1%)-Zn(1%)
(r) Ag-Sn(8.5%)-Bi(0.1%)-Mn(0.5%)-In(1%)
(s) Ag-Sn(8.5%)-Bi(0.1%)-Mg(0.5%)-Cd(3%)
(t) Ag-Sn(8.5%)-Bi(0.1%)-Zn(0.1%)-Cd(4%)

The above alloys (a) to (t) were tested about their contact resistances, in comparison with the specimens (1) to (6).

Test results are as given in the Table 1.

Test conditions were as follows:

Test as prescribed under ASTM-30 (Load: AC 200V, 13.5 A, Pf=50%. Contact force: 100 g.). Voltage drops (m) were measured by applying DC 6V, 1A.

It is apparent from the results that contact materials in accordance with this invention have improved contact resistances.

TABLE 1

| CYCLES | | Contact resistance (Voltage drop - M) | | | | | |
|---|---|---|---|---|---|---|---|
| Alloys | | 0 | 20,000 | 40,000 | 60,000 | 80,000 | 100,000 |
| Specimen | (1) | 0.23 | 0.30 | 0.42 | 0.46 | 0.44 | 0.46 |
| " | (2) | 0.55 | 10.20 | 12.80 | 21.60 | 30.80 | 45.00 |
| " | (3) | 0.46 | 7.60 | 8.20 | 10.00 | 11.23 | 12.50 |
| Alloy | (a) | 0.20 | 0.24 | 0.27 | 0.31 | 0.38 | 0.40 |
| " | (b) | 0.89 | 8.50 | 9.80 | 10.20 | 10.80 | 10.50 |
| " | (c) | 0.42 | 7.20 | 8.00 | 9.30 | 10.30 | 12.00 |
| " | (d) | 0.22 | 0.28 | 0.38 | 0.42 | 0.40 | 0.43 |
| " | (e) | 0.88 | 8.76 | 10.20 | 11.50 | 12.20 | 13.32 |
| " | (f) | 0.50 | 7.70 | 8.20 | 9.60 | 11.40 | 11.80 |
| " | (g) | 0.22 | 0.28 | 0.39 | 0.42 | 0.41 | 0.44 |
| " | (h) | 0.80 | 8.68 | 9.50 | 10.10 | 11.20 | 12.00 |
| " | (i) | 0.50 | 6.50 | 6.80 | 7.00 | 7.30 | 8.00 |
| " | (j) | 0.22 | 0.28 | 0.40 | 0.45 | 0.41 | 0.43 |
| " | (k) | 0.82 | 8.70 | 9.60 | 10.00 | 11.30 | 12.00 |
| " | (l) | 0.55 | 6.70 | 7.00 | 7.20 | 7.50 | 8.30 |

TABLE 1-continued

| CYCLES | | Contact resistance (Voltage drop - M) | | | | | |
|---|---|---|---|---|---|---|---|
| Alloys | | 0 | 20,000 | 40,000 | 60,000 | 80,000 | 100,000 |
| Specimen | (4) | 0.30 | 0.25 | 0.36 | 0.40 | 0.40 | 0.42 |
| " | (5) | 0.55 | 4.20 | 5.60 | 6.00 | 8.20 | 9.50 |
| " | (6) | 0.45 | 0.56 | 0.60 | 0.72 | 0.68 | 0.78 |
| Alloy | (m) | 0.30 | 0.30 | 0.32 | 0.35 | 0.34 | 0.38 |
| " | (n) | 0.52 | 4.00 | 5.30 | 5.70 | 8.00 | 8.10 |
| " | (o) | 0.40 | 0.50 | 0.52 | 0.60 | 0.62 | 0.63 |
| " | (p) | 0.45 | 0.52 | 0.58 | 0.62 | 0.65 | 0.68 |
| " | (q) | 0.42 | 0.53 | 0.55 | 0.68 | 0.66 | 0.72 |
| " | (r) | 0.45 | 0.50 | 0.55 | 0.58 | 0.56 | 0.60 |
| " | (s) | 0.43 | 0.54 | 0.58 | 0.70 | 0.66 | 0.73 |
| " | (t) | 0.40 | 0.51 | 0.56 | 0.65 | 0.63 | 0.68 |

As an embodiment of this invention, alloys of the aforementioned specimens (1) to (6) were melted and clad with silver to plates of 2 mm thickness. The plates were pressed out to obtain contacts of 6 mm diameter and 2 mm thickness. These contacts were internally oxidized at 700° C. and under an oxygen atmosphere of 3 atm. The surfaces were plated with films of either Zn, Cd, Ca, Zn-Sb, Zn-Cd, Zn-Ca, Sb-Cd, Sb-Ca, Cd-Ca, Zn-Sb-Cd, Zn-Sb-Ca, Sb-Cd-Ca, Ca-Cd-Zn, or Zn-Sb-Cd-Ca, and then internally oxidized, whereby one or more of the elements were diffused into the silver matrix of contacts and precipitated as additional alloy oxides. Contacts thus obtained had improved contact resistances, similarly to the aforementioned alloys (a) to (t). These kinds of contacts are within the scope of this invention, and electrical contact materials so termed in the specification and claims of this invention include such contacts.

What is claimed is:

1. An electrical contact material having improved contact resistance obtained by internally oxidizing an alloy of silver and solute metal elements, said alloy comprising a silver matrix, 3 to 11 weight percent of a first primary solute metal consisting of tin, and at least one other primary solute metal selected from a group consisting of indium and bismuth, the total weight percent of said primary solute metals being 3.01 to 16, and said alloy further comprising 0.1 to 5 weight percent of at least one additional solute metal element selected from a group consisting of Zn, Cd, and Ca, and which is diffused into the aforementioned internally oxidized alloy matrix and then is internally oxidized, each said additional metal element being precipitated in said alloy matrix and having the property of decomposing and subliming at a temperature about or lower than the melting point of silver.

2. An electrical contact material as claimed in claim 1, in which said other primary solute metal element comprises 1 to 13 weight percent of indium, the total amount of said primary elements being 4 to 16 weight percent.

3. An electrical contact material as claimed in claim 1, in which said additional solute metal elements include, in addition to at least one of said Zn, Cd, and Ca elements, at least one further solute metal element selected from the group consisting of Sb, Pb, Mn, Mg, Sn, Bi and In.

4. An electrical contact material as claimed in claim 1, in which said other primary solute metal element comprises 0.01 to 2 weight percent of bismuth, the total weight percent of said primary solute elements being 3.01 to 13.

* * * * *